United States Patent
Sato et al.

(10) Patent No.: US 10,913,332 B2
(45) Date of Patent: Feb. 9, 2021

(54) HEAT EXCHANGE UNIT

(71) Applicant: DENSO CORPORATION, Kariya (JP)

(72) Inventors: Go Sato, Kariya (JP); Takashi Yasuda, Kariya (JP); Koichi Harada, Kariya (JP); Ken Muto, Kariya (JP); Masaaki Kawakubo, Kariya (JP); Nobukazu Kuribayashi, Kariya (JP); Hiroyuki Sakane, Kariya (JP)

(73) Assignee: DENSO CORPORATION, Kariya (JP)

( * ) Notice: Subject to any disclaimer, the term of this patent is extended or adjusted under 35 U.S.C. 154(b) by 140 days.

(21) Appl. No.: 16/088,889

(22) PCT Filed: Mar. 2, 2017

(86) PCT No.: PCT/JP2017/008349
§ 371 (c)(1),
(2) Date: Sep. 27, 2018

(87) PCT Pub. No.: WO2017/169501
PCT Pub. Date: Oct. 5, 2017

(65) Prior Publication Data
US 2019/0135084 A1 May 9, 2019

(30) Foreign Application Priority Data

Mar. 31, 2016 (JP) .................................. 2016-070723

(51) Int. Cl.
*B60K 11/04* (2006.01)
*B60H 1/32* (2006.01)
(Continued)

(52) U.S. Cl.
CPC ............. *B60H 1/3227* (2013.01); *B60H 1/32* (2013.01); *B60K 11/04* (2013.01); *B60K 11/085* (2013.01);
(Continued)

(58) Field of Classification Search
CPC ........ B60K 11/04; B60K 11/085; B60H 1/32; B60H 1/321; B60H 1/3211; B60H 1/3213;
(Continued)

(56) References Cited

U.S. PATENT DOCUMENTS 5,782,102 A * 7/1998 Iritani ................ B60H 1/00021
62/197
6,016,774 A * 1/2000 Bokkers .................... F01P 5/06
123/41.1
(Continued)

FOREIGN PATENT DOCUMENTS

JP 2002240548 A 8/2002
JP 2008106727 A 5/2008
(Continued)

*Primary Examiner* — James A Shriver, II
*Assistant Examiner* — Steve Clemmons
(74) *Attorney, Agent, or Firm* — Harness, Dickey & Pierce, P.L.C.

(57) ABSTRACT

In a heat exchange unit, a shutter device is disposed on a vehicle front side with respect to a coolant heat exchanger to open and close a passage for traveling air directed toward the coolant heat exchanger. A blower is switchable between a first blowing state in which air flows from the vehicle front side to the vehicle rear side and a second blowing state in which air flows from the vehicle rear side to the vehicle front side. In a case where a switch that makes a vehicle travelable is in an on state, a control unit switches the blower to the second blowing state, while an open degree of the shutter device is set at a closing side from a maximum open degree of the shutter device when a temperature of the engine coolant is equal to or lower than a predetermined temperature determination value.

16 Claims, 8 Drawing Sheets

(51) Int. Cl.
*F01P 3/18* (2006.01)
*F01P 7/04* (2006.01)
*F01P 11/10* (2006.01)
*B60K 11/08* (2006.01)

(52) U.S. Cl.
CPC .................. *F01P 3/18* (2013.01); *F01P 7/04* (2013.01); *F01P 11/10* (2013.01)

(58) Field of Classification Search
CPC ............. B60H 1/3227; B60H 1/00907; B60H 2001/3248; B60H 2001/325; B60H 2001/3251; B60H 2001/3252; B60H 2001/3254; F01P 3/18; F01P 11/10
See application file for complete search history.

(56) References Cited

U.S. PATENT DOCUMENTS

| | | | |
|---|---|---|---|
| 7,007,856 B2 * | 3/2006 | La Falce | B60H 1/322 165/41 |
| 8,825,308 B2 * | 9/2014 | Nishimura | B60H 1/3208 180/68.1 |
| 9,376,010 B2 * | 6/2016 | Nam | B60K 11/04 |
| 9,840,144 B2 * | 12/2017 | Aizawa | B60K 11/085 |
| 10,344,663 B2 * | 7/2019 | Nam | B60H 1/3211 |
| 2004/0069481 A1 | 4/2004 | Ebara et al. | |
| 2007/0209612 A1 * | 9/2007 | Kojima | F02N 11/0818 123/41.49 |
| 2010/0147611 A1 | 6/2010 | Amano et al. | |
| 2015/0136353 A1 | 5/2015 | Niemann et al. | |

FOREIGN PATENT DOCUMENTS

| | | |
|---|---|---|
| JP | 2008221997 A | 9/2008 |
| JP | 2010111277 A | 5/2010 |
| JP | 2012246790 A | 12/2012 |
| JP | 2014149123 A | 8/2014 |
| JP | 2014159266 A | 9/2014 |
| JP | 2015101333 A | 6/2015 |
| JP | 2015182751 A | 10/2015 |
| JP | 2016022899 A | 2/2016 |
| JP | 2016080250 A | 5/2016 |
| KR | 20080040099 A * | 5/2008 |
| WO | WO-2016117377 A1 | 7/2016 |

* cited by examiner

HEAT EXCHANGE UNIT

CROSS REFERENCE TO RELATED APPLICATIONS

This application is a U.S. National Phase Application under 35 U.S.C. 371 of International Application No. PCT/JP2017/008349 filed on Mar. 2, 2017. This application is based on and claims the benefit of priority from Japanese Patent Application No. 2016-070723 filed on Mar. 31, 2016. The entire disclosures of all of the above applications are incorporated herein by reference.

FIELD OF THE INVENTION

The present disclosure relates to a heat exchange unit provided in an engine room of a vehicle.

BACKGROUND ART

As this type of heat exchange unit, a heat exchange unit mounted on a hybrid vehicle has been conventionally known and is described in, for example, Patent Document 1. The hybrid vehicle described in Patent Document 1 includes a vehicle air conditioner that performs air-heating using a heat pump function. In the control of the heat exchange unit in the hybrid vehicle, when the engine is stopped and the vehicle air conditioner performs air-heating, if frost formation at an exterior heat exchanger is detected, a request for turning on the engine is made to start up the engine. At the same time, an electric fan for radiator cooling is rotated in a reverse direction to close a radiator shutter provided at the vehicle front side of the radiator. In this way, the exterior heat exchanger can be defrosted with waste heat from the engine and the radiator.

RELATED ART DOCUMENTS

Patent Document

Patent Document 1: Japanese Unexamined Patent Application Publication No. 2008-221997

SUMMARY OF INVENTION

As mentioned above, in the heat exchange unit described in Patent Document 1, a blower, which is the electric fan, is rotated in the reverse direction under a predetermined condition to switch its blowing direction, thereby defrosting the exterior heat exchanger. In contrast, the inventors have found that such switching of the blowing direction of the blower can be used for other applications as well as the defrosting of the exterior heat exchanger. For example, the inventors have conceived of switching the blowing direction of the blower in order to accelerate warming-up of the engine.

In view of the foregoing matter, it is an object of the present disclosure to provide a heat exchange unit which is capable of accelerating the warming-up of the engine.

A heat exchange unit according to an aspect of the present disclosure includes:

a coolant heat exchanger disposed on a vehicle front side in an engine room in which an engine is accommodated, the engine room being capable of taking in traveling air from the vehicle front side, the coolant heat exchanger being configured to exchange heat between an engine coolant flowing through the engine and air;

a shutter device disposed on a vehicle front side with respect to the coolant heat exchanger, the shutter device being configured to be capable of opening and closing a passage for the traveling air that is directed toward the coolant heat exchanger;

a blower disposed on a vehicle rear side with respect to the shutter device in the engine room, the blower being configured to be switchable between a first blowing state in which air flows from the vehicle front side to the vehicle rear side with respect to the coolant heat exchanger and a second blowing state in which air flows from the vehicle rear side to the vehicle front side with respect to the coolant heat exchanger; and a control unit that is configured to switch the blower to the second blowing state while setting an open degree of the shutter device at a closing side from a maximum open degree of the shutter device, when a temperature of the engine coolant is equal to or lower than a predetermined temperature determination value in a case where a switch that makes a vehicle travelable is in an on state.

With this configuration, the engine coolant is less likely to be cooled by the traveling air, and concurrently, the hot air from the engine can be directed toward the coolant heat exchanger. Thus, the engine coolant can be heated more easily by the coolant heat exchanger, thereby speeding up the temperature increase of the engine coolant. As a result, the warming-up of the engine can be accelerated. The vehicle to which the heat exchange unit of the present disclosure is applied is not limited to the hybrid vehicle.

DESCRIPTION OF EMBODIMENTS

Figure 1:
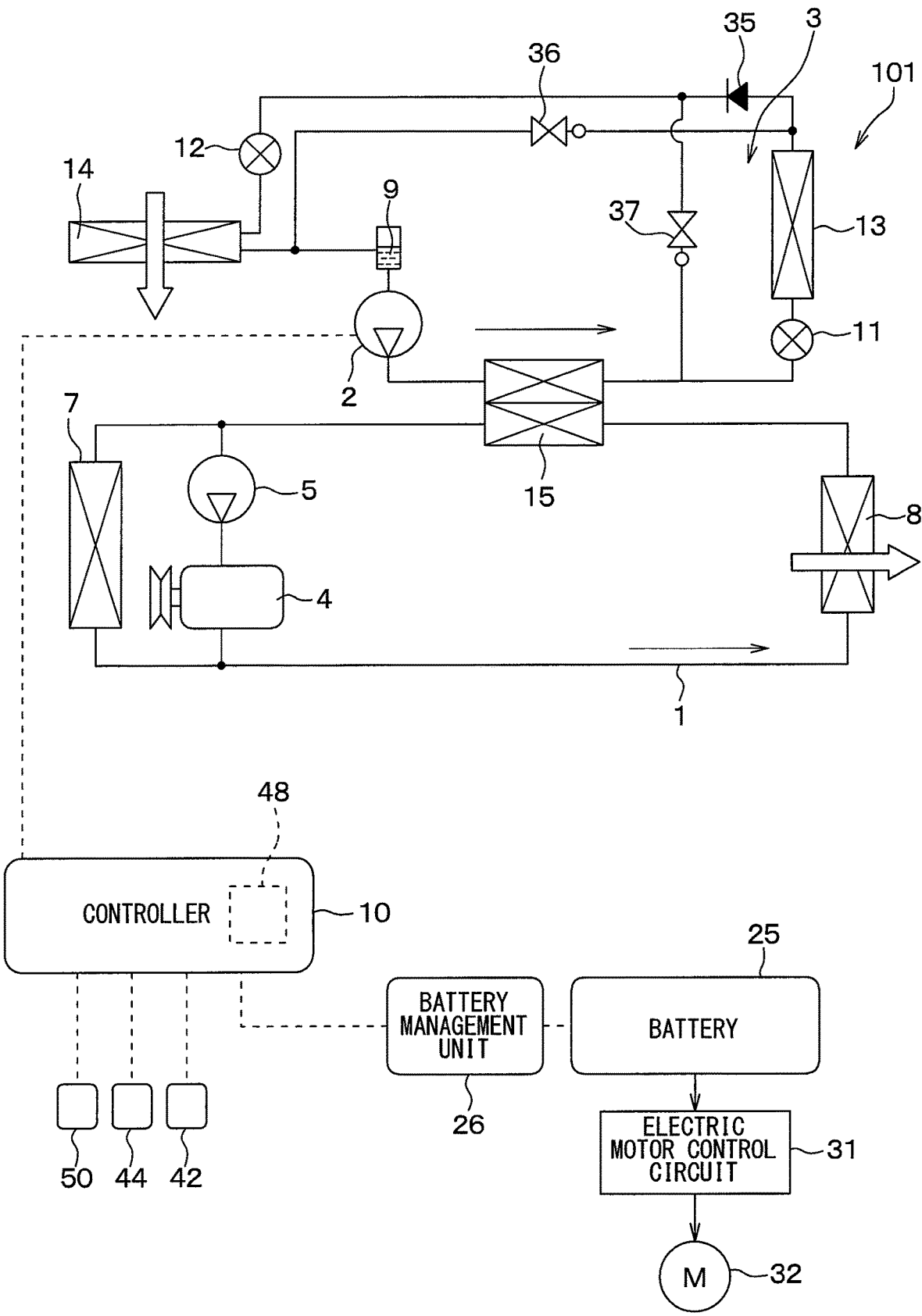
FIG. 1 is a schematic configuration diagram showing an outline of the entire configuration of a vehicle air conditioner included in a vehicle according to a first embodiment, while showing a schematic configuration of a traveling electric motor and a periphery thereof.

Respective embodiments will be described below with reference to the accompanying drawings. Note that in the embodiments below, the same or equivalent parts are indicated by the same reference characters throughout the figures.

First Embodiment

FIG. 1 is a schematic configuration diagram schematically showing the entire configuration of a vehicle air conditioner 101 included in a vehicle 100 (see FIG. 2) according to a present embodiment, while showing a schematic configuration of a traveling electric motor 32 and a periphery thereof. The vehicle 100 shown in the present embodiment is a hybrid vehicle and includes an engine 4 and the electric motor 32 as driving power sources for traveling. In addition, the vehicle 100 of the present embodiment can generate electric power by using engine power to charge a battery 25 therewith, which is a power source of the electric motor 32.

As shown in FIG. 1, the vehicle 100 includes a controller 10, the battery 25 that supplies electric power to the electric motor 32 for driving wheels, a battery management unit 26 that manages the state of the battery 25, and an electric motor control circuit 31. The state of the battery 25 is specified by, for example, a battery voltage, a battery temperature, a battery remaining charge, and the like. For example, the controller 10 of the vehicle 100 can grasp the remaining battery charge of the battery 25 via the battery management unit 26. The electric motor 32 is supplied with electric power from the battery 25 via the electric motor control circuit 31. The controller 10 includes a control unit 48 for controlling a shutter device 42 and a blower 44, which will be described later.

The vehicle air conditioner 101 includes a heat-exchange liquid circuit 1 and a refrigeration cycle circuit 3. The circuit configuration of the heat-exchange liquid circuit 1 and the circuit configuration of the refrigeration cycle circuit 3 shown in FIG. 1 are almost the same as those described in, for example, Japanese Unexamined Patent Application Publication No. 2016-22899.

Therefore, the heat-exchange liquid circuit 1 of the vehicle air conditioner 101 is a liquid circuit in which an engine coolant (in other words, warm water) circulates as the heat-exchange liquid for cooling the engine 4. The refrigeration cycle circuit 3 is a refrigerant circuit in which the refrigerant compressed by a compressor 2 circulates and configures a heat pump. For example, as a coolant refrigerant heat exchanger 15 exchanges heat between the engine coolant circulating in the heat-exchange liquid circuit 1 and the refrigerant discharged from the compressor 2, the refrigeration cycle circuit 3 heats the engine coolant via the coolant refrigerant heat exchanger 15.

The heat-exchange liquid circuit 1 includes a water pump 5 that causes the engine coolant to flow to the engine 4 as a heat source, a radiator 7, and a heater core 8 that exchanges heat between the engine coolant and conditioned air to be blown into the vehicle.

The water pump 5 is an electric pump. In the heat-exchange liquid circuit 1, an impeller is rotated by a motor to circulate the engine coolant for engine cooling. The engine coolant discharged from the water pump 5 is branched and flows to a path on the side of the radiator 7 and a path on the side of the heater core 8 after circulating through the engine 4.

The engine coolant flowing to the path on the side of the radiator 7 flows through the radiator 7 and is drawn into the water pump 5. Meanwhile, the engine coolant flowing to the path on the side of the heater core 8 sequentially flows through the heater core 8 and the coolant refrigerant heat exchanger 15 in this order, and is then drawn into the water pump 5.

Figure 2:
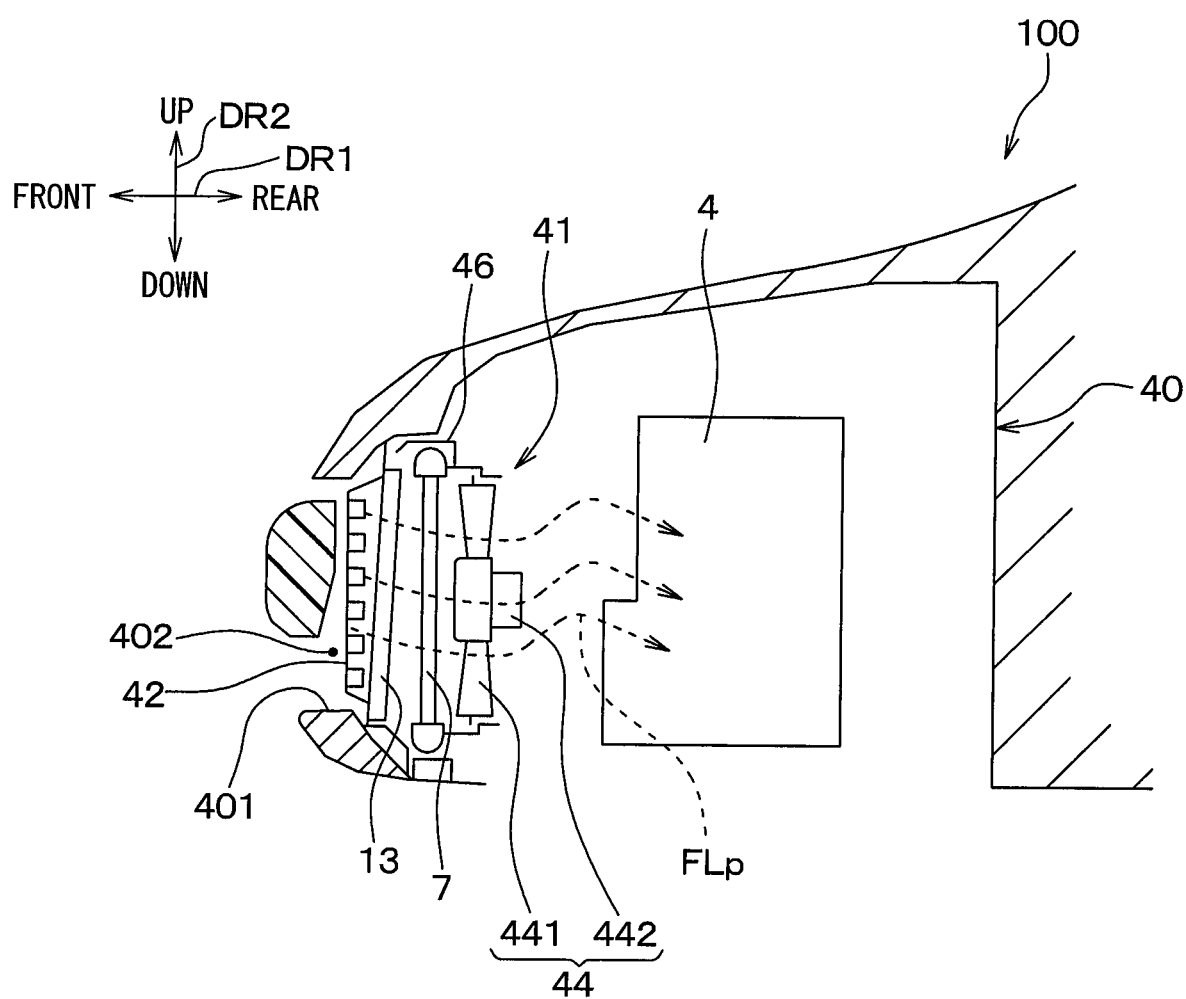
FIG. 2 is a schematic diagram schematically showing a cross section of a vehicle front portion including an engine room of the vehicle in the first embodiment, and specifically showing a state in which a shutter device is in a fully open state and a blower is in a first blowing state.

FIG. 2 is a schematic diagram schematically showing a cross section of the vehicle front portion including an engine room 40 of the vehicle 100. As shown in FIGS. 1 and 2, the radiator 7 is a coolant heat exchanger that exchanges heat between the engine coolant flowing through the engine 4 and air passing through the radiator 7.

The radiator 7 is disposed on the vehicle front side in the engine room 40 that accommodates the engine 4 therein. The engine room 40 has an opening 401 located on the front side of the engine room 40 and open to the outside of the vehicle. The engine room 40 is configured to be capable of taking in the traveling air from the vehicle front side via the opening 401. For example, air as traveling air flowing from the opening 401 into the engine room 40 or air flowing from the blower 44 described later is heat-exchanged with the engine coolant by the radiator 7.

Respective arrows DR1 and DR2 shown in FIG. 2 and an arrow DR3 shown in FIG. 6 described later indicate the directions of the vehicle 100. That is, the arrow DR1 in FIG. 2 indicates the vehicle front-rear direction DR1, and the arrow DR2 indicates the vehicle vertical direction DR2. The arrow DR3 in FIG. 6 indicates the vehicle width direction DR3 (that is, the vehicle left-right direction DR3).

The heater core 8 shown in FIG. 1 is a heat exchanger provided in an air-conditioning duct and that heats air outside the vehicle cabin (i.e., outside air) or air inside the vehicle cabin (i.e., inside air) blown by an air-conditioning blower. A thermostat or the like for controlling the flow rate of the coolant flowing to the radiator 7 in the heat-exchange liquid circuit 1 is not shown.

The refrigeration cycle circuit 3 includes the compressor 2 that compresses the refrigerant, an exterior heat exchanger 13, an interior heat exchanger 14 that cools the conditioned air by serving as an evaporator, an accumulator 9 that stores an excess refrigerant, electronic expansion valves 11 and 12, a check valve 35, and solenoid valves 36 and 37. The respective open degrees of the electronic expansion valves 11 and 12 are adjusted by the controller 10. The solenoid valves 36 and 37 are on/off valves that are respectively opened and closed by the controller 10.

As shown in FIGS. 1 and 2, the exterior heat exchanger 13 is disposed on the vehicle front side with respect to the radiator 7 in the engine room 40. In detail, the exterior heat exchanger 13 is disposed between the shutter device 42 and the radiator 7.

The exterior heat exchanger 13 exchanges heat between the air passing through the exterior heat exchanger 13 and the air-conditioning refrigerant. The air-conditioning refrigerant to be heat-exchanged is specifically the refrigerant flowing out of the first electronic expansion valve 11 in the refrigeration cycle circuit 3. For example, the traveling air flowing from the opening 401 into the engine room 40 or air flowing from the blower 44 described later is heat-exchanged with the refrigerant in the exterior heat exchanger 13.

As shown in FIG. 2, the vehicle 100 includes the shutter device 42, the blower 44, and a shroud 46 in addition to the radiator 7 and the exterior heat exchanger 13, mentioned above. The radiator 7, the exterior heat exchanger 13, the shutter device 42, the blower 44, and the shroud 46 configure one module, that is, a cooling module 41. In the vehicle 100 of the present embodiment, the cooling module 41 and the control unit 48 function as a whole, as a heat exchange unit that performs heat exchange in the engine room 40.

For example, the shutter device 42 is attached to the exterior heat exchanger 13, and a motor 442 of the blower 44 is attached to the shroud 46. Concurrently with this, the exterior heat exchanger 13 and the shroud 46 are attached to the radiator 7. The radiator 7, the exterior heat exchanger 13, the shutter device 42, the blower 44, and the shroud 46 are integrally assembled together as the cooling module 41. In this situation, the cooling module 41 is mounted on the vehicle body. The cooling module 41 is disposed between an opening 401 of the engine room 40 and the engine 4 within the engine room 40. The respective components 7, 13, 42, 44, and 46 included in the cooling module 41 can be coupled by adopting various coupling methods, such as bolting or welding.

The shutter device 42, the exterior heat exchanger 13, the radiator 7, and the blower 44 are disposed from the vehicle front side in this order. That is, any one of the exterior heat exchanger 13, the radiator 7, and the blower 44 is disposed on the vehicle rear side with respect to the shutter device 42 in the engine room 40. Thus, the blower 44 can generate an air flow in the engine room 40 and cause the air to flow to the exterior heat exchanger 13 and the radiator 7, regardless of opening and closing of the shutter device 42.

The shutter device 42 is an air passage opening/closing device configured to be capable of opening and closing a passage 402 for the traveling air that travels toward the radiator 7 through the opening 401. The shutter device 42 is electrically operated and controlled by the control unit 48.

Specifically, the shutter device 42 is formed in a louver shape. That is, as shown in FIGS. 3A to 3D, the shutter device 42 includes a plurality of rectangular blades 421 extending in the vehicle width direction DR3 (in other words, blades 421), and a plurality of rotary shafts 422 to which the respective blades 421 are fixed. Each of FIGS. 3A to 3D shows two of a plurality of sets of blades 421 and rotary shafts 422 that are included in the shutter device 42. FIGS. 3A to 3D omit the illustration of the blades 421 and rotation shafts 422 other than the two sets thereof. The arrows ARa shown in FIGS. 3A to 3D indicate the traveling air blown from the vehicle front side into the engine room 40.

Each of the plurality of blades 421 in the shutter device 42 rotates around the axis line of the corresponding rotary shaft 422 as indicated by the arrow ARr. For example, the plurality of blades 421 are rotated by an electric motor or the like. The plurality of blades 421 are mutually interlocked and rotated so as to be parallel with each other. The axial direction of the rotary shaft 422 is a vehicle width direction DR3.

Figure 3A:
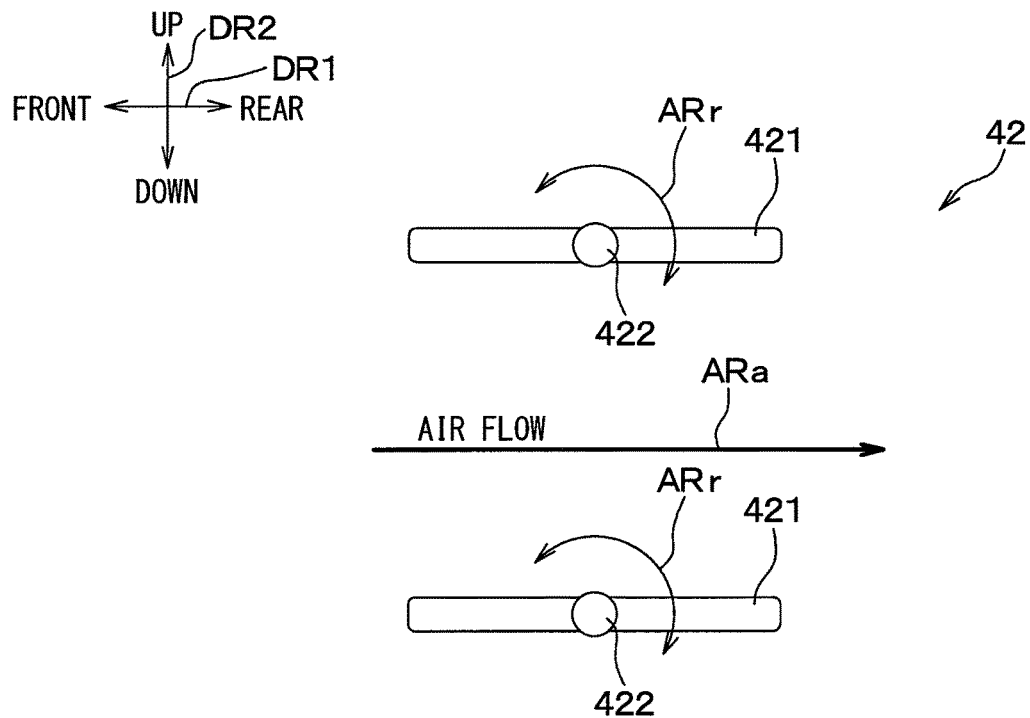
FIG. 3A is a diagram showing a specific structure of the shutter device in the first embodiment, and specifically showing the fully open state of the shutter device.

The open degree of the shutter device 42 is increased or decreased by the rotation of the plurality of blades 421, thereby changing the open degree of the shutter device 42 within a predetermined opening range. That is, when the open degree of the shutter device 42 reaches the maximum open degree (i.e., 100%) within the predetermined open degree range, the shutter device 42 is in the fully open state as shown in FIG. 3A. In the fully open state, a mutual clearance between the blades 421 is maximal, and for example, all of the plurality of blades 421 are oriented along the vehicle front-rear direction DR1.

Figure 3B:
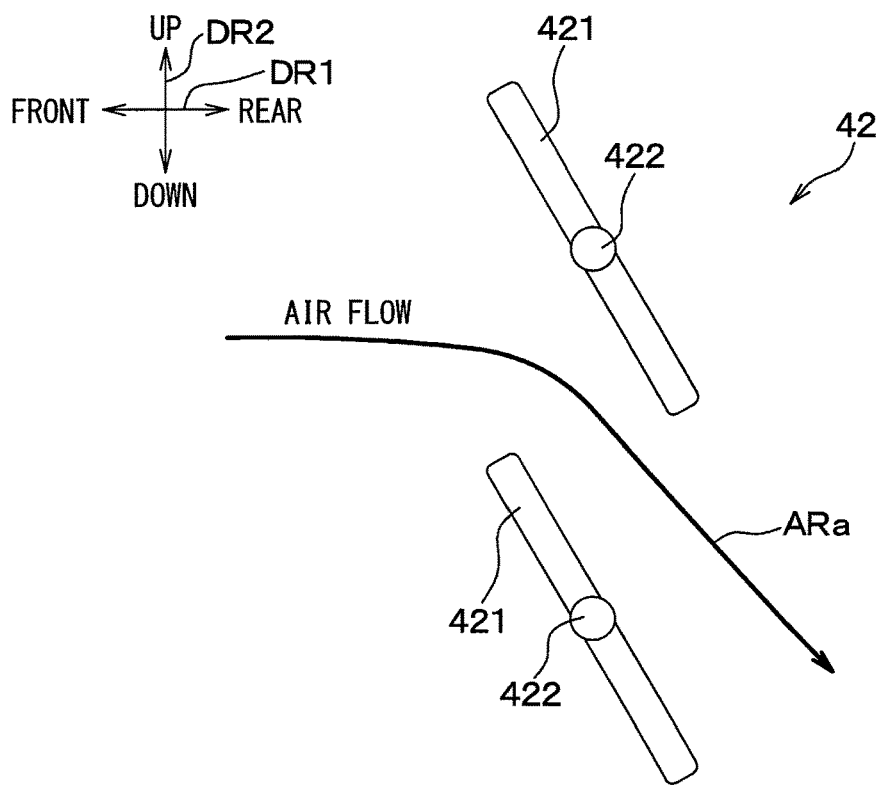
FIG. 3B is a diagram showing a specific structure of the shutter device in the first embodiment, and specifically showing a semi-open state on a larger open degree side in which an open degree of the shutter device is smaller than that in the fully open state.

When the open degree of the shutter device 42 becomes smaller than the maximum open degree within the predetermined open degree range, for example, as shown in FIG. 3B, the shutter device 42 is brought into the semi-open state on the larger open degree side. In the semi-open state on the larger open degree side, the plurality of blades 421 are inclined with respect to the vehicle front-rear direction DR1 such that the mutual clearance between the blades 421 is smaller than that in the full-open state, and that the vehicle rear side of each blade 421 is directed obliquely downward with respect to the horizontal direction.

Figure 3C:
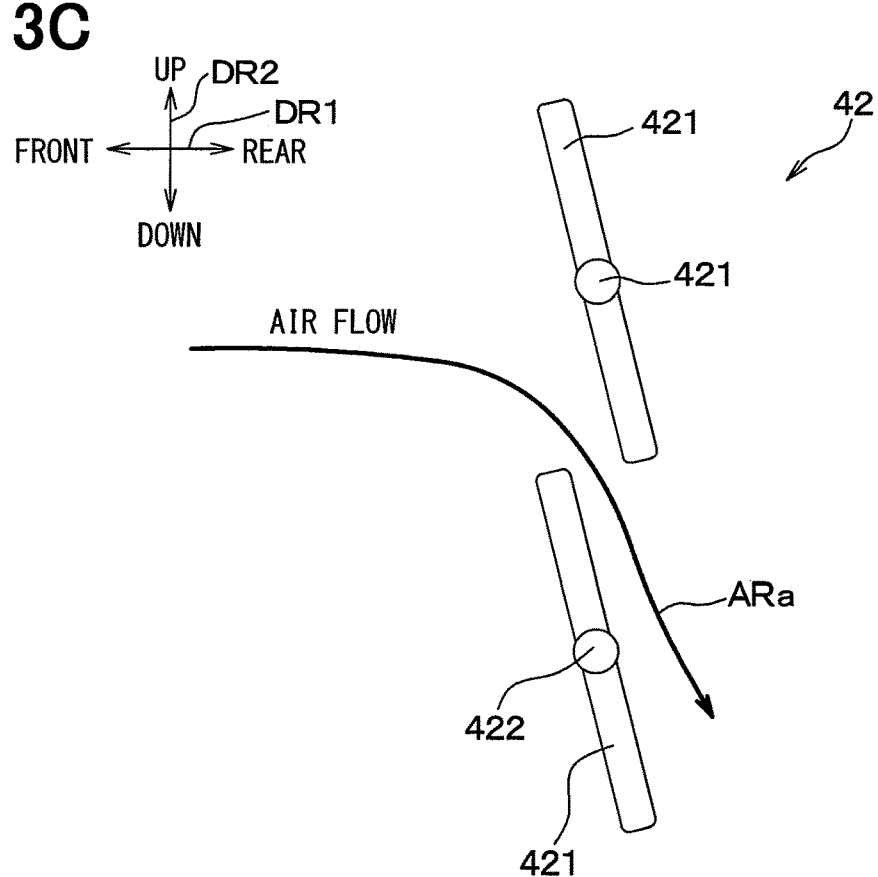
FIG. 3C is a diagram showing a specific structure of the shutter device in the first embodiment, and specifically showing a semi-open state on a smaller open degree side in which an open degree of the shutter device is smaller than that in the semi-open state on the larger open degree side.

When the open degree of the shutter device 42 becomes even smaller than an open degree in the semi-open state on the larger open degree side within the predetermined open degree range, for example, as shown in FIG. 3C, the shutter device 42 is brought into the semi-open state on the smaller open degree side. In the semi-open state on the smaller open degree side, the plurality of blades 421 are inclined with respect to the vehicle front-rear direction DR1 such that the mutual clearance between the blades 421 is smaller than that in the semi-open state on the larger open degree side, and that the vehicle rear side of each blade 421 is further directed obliquely downward with respect to the horizontal direction.

Figure 3D:
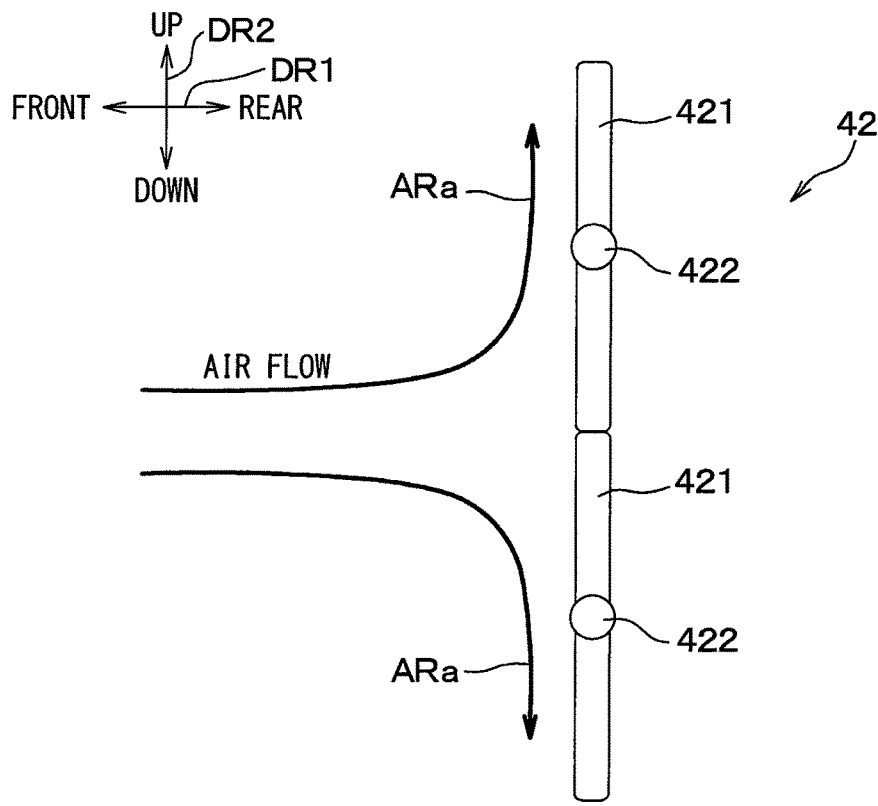
FIG. 3D is a diagram showing a specific structure of the shutter device in the first embodiment, and specifically showing a fully closed state of the shutter device.
Figure 4:
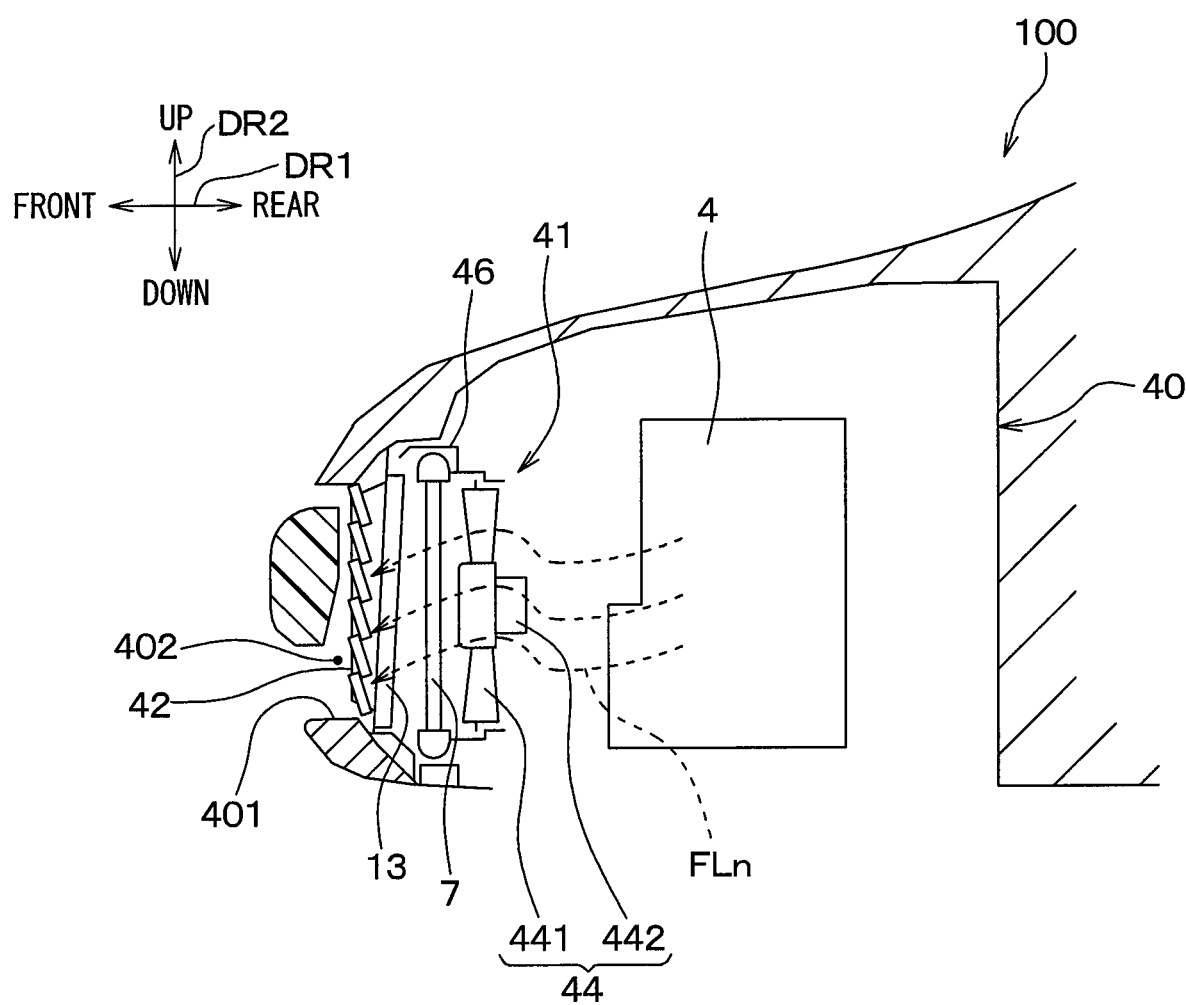
FIG. 4 is a schematic diagram schematically showing a cross section of the vehicle front portion in the same manner as in FIG. 2, and specifically showing a state in which the shutter device is in a fully closed state and the blower is in a second blowing state in the first embodiment.

When the open degree of the shutter device 42 reaches the minimum open degree (i.e., 0%) within the predetermined open degree range, for example, the shutter device 42 is in the fully closed state as shown in FIG. 3D. In the fully closed state, the blades 421 are in contact with each other, so that the mutual clearance between the blades 421 is closed. That is, in the fully closed state of the shutter device 42, as shown in FIG. 4, the passage 402 for the traveling air directed toward the radiator 7 through the opening 401 of the engine room 40 is blocked by the shutter device 42. Thus, the inflow of the traveling air into the engine room 40 is blocked or substantially blocked.

In this way, as shown in FIGS. 3A to 3D, as the open degree of the shutter device 42 decreases, the shutter device 42 decreases the mutual clearance between the blades 421, so that the volume of the air passing through the shutter device 42 becomes smaller. Concurrently, the shutter device 42 changes the direction of air passing through the shutter device 42, depending on the direction of each blade 421. That is, when the open degree of the shutter device 42 is smaller than the maximum open degree and larger than the minimum open degree, the shutter device 42 deflects the direction of the air passing through the shutter device 42 downward as indicated by the arrows ARa in FIGS. 3B and 3C. In detail, the smaller the open degree of the shutter device 42, the larger the angle formed by the direction of the air passing through the shutter device 42 with respect to the vehicle front-rear direction DR1 becomes.

Returning to FIG. 2, the blower 44 is a general electric axial flow blower. In detail, as shown in FIG. 2, the blower 44 includes an axial-flow fan 441 that generates an air flow in the vehicle front-rear direction DR1, and the motor 442 that rotationally drives the fan 441. The motor 442 operates in response to a control signal from the control unit 48, so that, for example, the rotational speed and rotational direction of the motor 442 are controlled by the control unit 48.

The blower 44 is configured to be switchable between the first blowing state in which air flows from the vehicle front side to the vehicle rear side with respect to the radiator 7 and the second blowing state in which air flows from the vehicle rear side to the vehicle front side with respect to the radiator 7. That is, the fan 441 of the blower 44 can rotate in either the forward rotation direction or the reverse rotation direction opposite to the forward rotation direction.

Specifically, the first blowing state of the blower 44 is a state in which the blower 44 blows air as indicated by the arrow FLp shown in FIG. 2. The blower 44 is switched to the first blowing state by the forward rotation of the fan 441. The second blowing state of the blower 44 is a state in which the blower 44 blows air as indicated by the arrow FLn in FIG. 4, and the blower 44 is switched to the second blowing state by the reverse rotation of the fan 441.

The shroud 46 is, for example, a resin molded part. The shroud 46 is formed to cover the passage 402 for the traveling air that is directed toward the radiator 7 through the opening 401, between the shutter device 42 and the radiator 7. For example, the shroud 46 is provided to surround the passage 402, and forms the passage 402 inside the shroud 46 itself.

The shroud 46 further extends from an arrangement location of the radiator 7 to an arrangement location of the blower 44 in the vehicle front-rear direction DR1. In short, the shroud 46 forms an air passage inside the shroud 46 itself through which the traveling air or the ventilation air from the blower 44 flows, between the shutter device 42 and the blower 44.

Next, switching of the operation mode of the refrigeration cycle circuit 3 shown in FIG. 1 will be described. The operation modes include, for example, an air-cooling mode, an air-cooling dehumidifying mode, an air-heating mode, an air-heating dehumidifying mode, and a defrosting mode. The refrigeration cycle circuit 3 is operated in any one of these operation modes. For example, the operation mode of the refrigeration cycle circuit 3 is switched by the action of the check valve 35 and the solenoid valves 36 and 37 included in the refrigeration cycle circuit 3.

In the air-cooling mode and the air-cooling dehumidifying mode, the refrigerant circulating in the refrigeration cycle circuit 3 dissipates heat in the coolant refrigerant heat exchanger 15 and the exterior heat exchanger 13, and absorbs heat in the interior heat exchanger 14. Thus, the first electronic expansion valve 11 is fully open. Concurrently, the second electronic expansion valve 12 controls the temperature of the interior heat exchanger 14 functioning as an evaporator by adjusting the flow rate of the refrigerant therethrough. The solenoid valves 36 and 37 both are closed.

In the air-heating mode, the refrigerant dissipates heat in the coolant refrigerant heat exchanger 15 and absorbs heat in the exterior heat exchanger 13. Thus, the first electronic expansion valve 11 controls the temperature in the exterior heat exchanger 13 functioning as the evaporator by adjusting the flow rate of the refrigerant. At this time, the second electronic expansion valve 12 is fully closed. The first solenoid valve 36 is opened, while the second solenoid valve 37 is closed.

In the air-heating dehumidifying mode, the refrigerant dissipates heat in the coolant refrigerant heat exchanger 15 and absorbs heat in the exterior heat exchanger 13 and the interior heat exchanger 14. Thus, the first electronic expansion valve 11 controls the temperature in the exterior heat exchanger 13 functioning as the evaporator by adjusting the flow rate of the refrigerant. The second electronic expansion valve 12 also adjusts the flow rate of the refrigerant. The solenoid valves 36 and 37 both are open.

In the air-heating mode and the air-heating dehumidifying mode, the refrigeration cycle circuit 3 heats the engine coolant in the heat-exchange liquid circuit 1 via the coolant refrigerant heat exchanger 15 with the heat of the high-temperature refrigerant pressurized by the compressor 2, and heats the conditioned air via the heater core 8 through which the engine coolant flows.

In the defrosting mode, the refrigerant dissipates heat in the exterior heat exchanger 13 without absorbing or experiencing anything in the coolant refrigerant heat exchanger 15. Thus, the first electronic expansion valve 11 is fully open. The second electronic expansion valve 12 is fully closed. The first solenoid valve 36 is opened, while the second solenoid valve 37 is closed.

The control unit 48 shown in FIG. 1 is an electronic control unit configured by a microcomputer including a CPU, a ROM, a RAM, and the like (not shown). A signal from a sensor or the like, connected to the control unit 48, is A/D-converted by an input circuit (not shown) and then input to the microcomputer. The control unit 48 executes various controls, for example, shutter open degree control for adjusting the open degree of the shutter device 42, and blower control for selectively switching the blower 44 between the first blowing state and the second blowing state.

Figure 5:
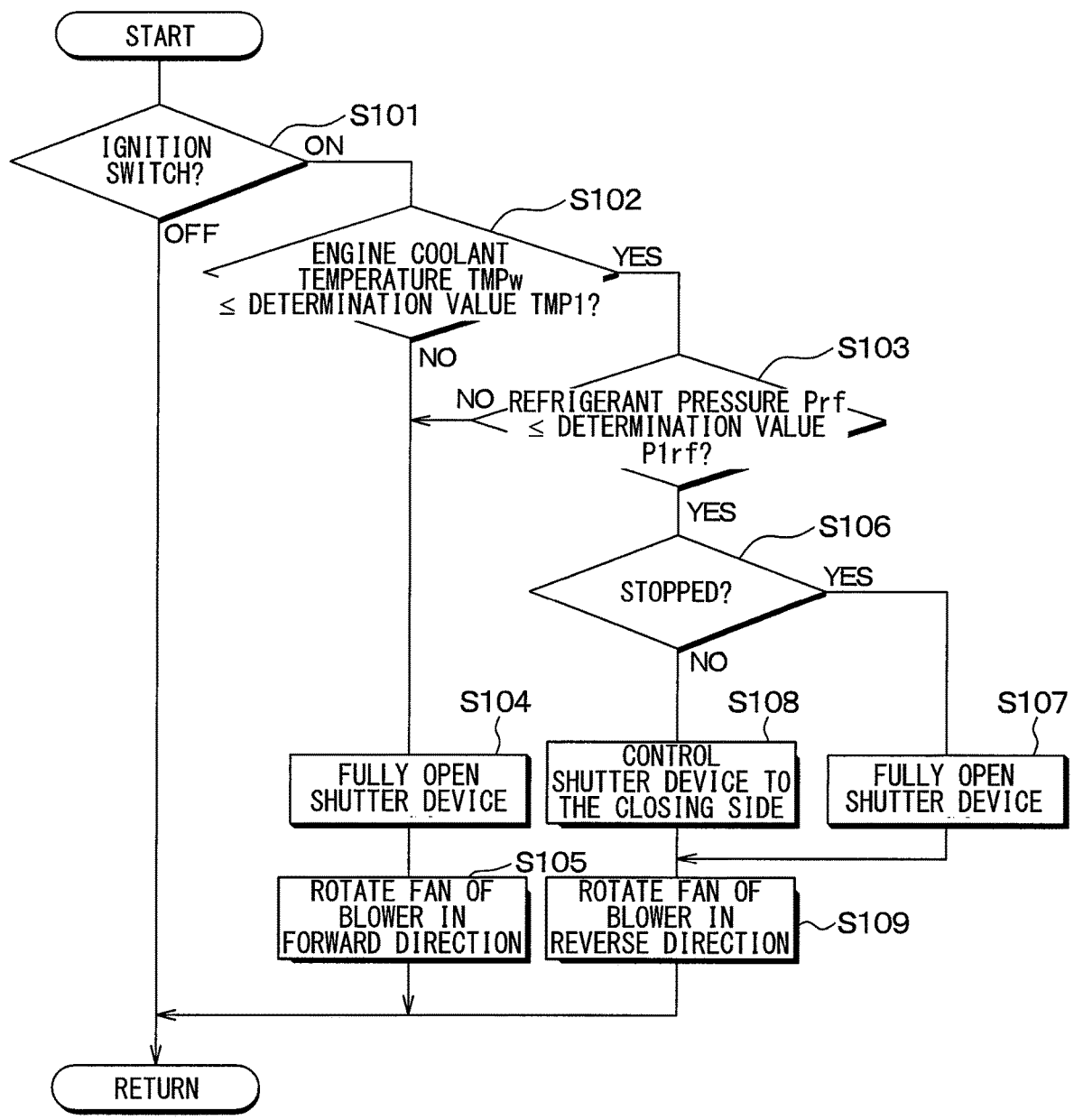
FIG. 5 is a flowchart showing control processing executed by a control unit in the first embodiment.

FIG. 5 is a flowchart showing control processing for executing the shutter open degree control and the blower control. The control unit 48 periodically and repeatedly executes the control processing shown in FIG. 5.

As shown in FIG. 5, first, in step S101, the control unit 48 determines whether or not an ignition switch 50 (hereinafter abbreviated as an IG switch 50) is in an on state. The IG switch 50 is a switch for making the vehicle 100 travelable, and is operated by an occupant. That is, when the IG switch 50 is brought into the on state, the vehicle 100 becomes travelable (i.e., an on state of a hybrid system). Conversely, when the IG switch 50 is switched to a state, such as an OFF state, other than the on state, the vehicle 100 is untravelable (i.e., an OFF state of the hybrid system).

The IG switch 50 is also called, for example, a start switch in the field of electric vehicles or the like. The IG switch 50 may be, for example, a push-button switch, or may be of a type in which a key is inserted into a key cylinder and the key is rotated.

When the IG switch 50 is determined to be in the on state in step S101, the control processing proceeds to step S102. Meanwhile, when the IG switch 50 is determined to be in a switched state (for example, OFF state) other than the on state, the flowchart of FIG. 5 is ended, and the control processing restarts from step S101.

When the IG switch 50 is determined to be in a switched state other than the on state, the shutter device 42 may be set at a predetermined open degree, for example, in the fully open state, or the open degree of the shutter device 42 may be maintained at the present state. In addition, the blower 44 may be stopped, or the operating state of the blower 44 may also be maintained at the present state.

In step S102, the control unit 48 detects the temperature TMPw of the engine coolant, i.e., an engine coolant temperature TMPw. The engine coolant temperature TMPw may be detected at any position of the heat-exchange liquid circuit 1 when the temperature detection position of the engine coolant temperature is determined in advance. In the present embodiment, for example, the engine coolant temperature TMPw is detected by a coolant temperature sensor at the engine coolant inlet or the engine coolant outlet of the radiator 7. The engine coolant temperature TMPw is an index value indicative of the temperature of the engine 4.

In step S102, the control unit 48 determines whether or not the detected engine coolant temperature TMPw is equal to or lower than a predetermined temperature determination value TMP1. The temperature determination value TMP1 is set experimentally in advance, for example, so that the engine 4 can be determined to be in a cold state that requires the acceleration of warming-up of the engine 4 when the engine coolant temperature TMPw is equal to or lower than the temperature determination value TMP1. The temperature determination value TMP1 is set as a control threshold value of the temperature at which the blower 44 is set in the first blowing state.

When the engine coolant temperature TMPw is determined to be equal to or lower than the temperature determination value TMP1 in step S102, the control processing proceeds to step S103. Meanwhile, when the engine coolant temperature TMPw is determined to be higher than the temperature determination value TMP1, the control processing proceeds to step S104.

In step S103, the control unit 48 detects a refrigerant pressure Prf in the exterior heat exchanger 13, that is, an outdoor-unit refrigerant pressure Prf. For example, a pressure sensor is provided for detecting the refrigerant pressure at the refrigerant inlet of the exterior heat exchanger 13. The refrigerant pressure detected by the pressure sensor is regarded as the outdoor-unit refrigerant pressure Prf.

In step S103, the control unit 48 determines whether or not the detected outdoor-unit refrigerant pressure Prf is equal to or lower than a predetermined refrigerant pressure determination value P1rf. For example, the refrigerant pressure determination value P1rf is set experimentally in advance so that the refrigerant pressure determination value P1rf can determine that the exterior heat exchanger 13 should be cooled in order to ensure the air-conditioning performance of the refrigeration cycle circuit 3 if the outdoor-unit refrigerant pressure Prf is higher than the refrigerant pressure determination value P1rf. The refrigerant pressure determination value P1rf is set as a control threshold value of the refrigerant pressure at which the blower 44 is set in the first blowing state. In this embodiment, as the operation mode of the refrigeration cycle circuit 3 is switched, the refrigerant pressure determination value P1rf is set for each operation mode.

When the outdoor-unit refrigerant pressure Prf is determined to be equal to or lower than the refrigerant pressure determination value P1rf in step S103, the control processing proceeds to step S106. Meanwhile, when the outdoor-unit refrigerant pressure Prf is determined to be higher than the refrigerant pressure determination value P1rf, the control processing proceeds to step S104.

In step S104, the control unit 48 sets the shutter device 42 in the fully open state. Thus, the traveling air easily flows into the engine room 40. If the shutter device 42 is already in the fully open state, the shutter device 42 is maintained in the fully open state. After step S104, the control processing proceeds to step S105.

In step S105, the control unit 48 rotates the fan 441 of the blower 44 in the forward direction to bring the blower 44 into the first blowing state. If the blower 44 is already in the first blowing state, the blower 44 is maintained in the first blowing state. Thus, air is blown by the blower 44 within the engine room 40 as indicated by the arrow FLp in FIG. 2. For example, the inflow of the traveling air into the engine room 40 is accelerated by the negative pressure generated by the blower 44. Subsequently, the traveling air passes through the exterior heat exchanger 13 and the radiator 7 to cool the engine 4 as well. At the end of step S105, the flowchart of FIG. 5 ends, and then the control processing restarts from step S101.

In step S106, the control unit 48 determines whether or not the vehicle 100 is stopped. For example, the vehicle speed is detected by a vehicle speed sensor, and when the detected vehicle speed is 0 km/h, the control unit 48 determines that the vehicle 100 is stopped. Meanwhile, when the vehicle speed is higher than 0 km/h, the control unit 48 determines that the vehicle 100 is traveling.

When the vehicle 100 is determined to be stopped in step S106, the control processing proceeds to step S107. On the other hand, when the vehicle 100 is determined not to be stopped but to be traveling, the control processing proceeds to step S108.

In step S107, the control unit 48 sets the shutter device 42 in the fully open state. If the shutter device 42 is already in the fully open state, the shutter device 42 is maintained in the fully open state. After step S107, the control processing proceeds to step S109.

In step S108, the control unit 48 sets the open degree of the shutter device 42 to a closing side from the maximum open degree of the shutter device 42. The fully open state in which the open degree of the shutter device 42 is set to the maximum open degree is shown, for example, in FIG. 3A. In step S108, the shutter device 42 is in a state shown, for example, in FIG. 3B, 3C, or 3D.

Specifically, the open degree of the shutter device 42 is determined depending on the vehicle speed within an open degree range where the shutter device is closed more than the maximum open degree in accordance with a shutter open degree map that experimentally defines the relationship between its open degree and the vehicle speed in advance. The open degree range of the shutter device 42 is defined, for example, as a range including the fully closed state of the shutter device 42.

The open degree of the shutter device 42 is determined in accordance with the shutter open degree map such that as the vehicle speed becomes higher, the open degree is decreased. The shutter device 42 is operated to have the determined open degree. For example, the relationship between the open degree of the shutter device 42 and the vehicle speed, which is defined in the shutter open degree map, may be set such that as the vehicle speed becomes higher, the open degree of the shutter device 42 is decreased in stages or continuously.

As described above, in steps S106 to S108 in FIG. 5, the control unit 48 executes the shutter open degree control, which is the control of the open degree of the shutter device 42. In detail, the shutter open degree control includes setting the open degree of the shutter device 42 to the maximum open degree in step S107, and setting the open degree of the shutter device 42 at a closing side from the maximum open degree of the shutter device 42 in step S108. After step S108, the control processing proceeds to step S109.

In step S109, the control unit 48 rotates the fan 441 of the blower 44 in the reverse direction to switch the blower 44 to the second blowing state. If the blower 44 is already in the second blowing state, the blower 44 is maintained in the second blowing state. Thus, air is blown by the blower 44 within the engine room 40 as indicated by the arrow FLn in FIG. 4. For example, warm air around the engine 4 (i.e., hot air from the engine 4) is sent by the blower 44 to the radiator 7 and the exterior heat exchanger 13. At this time, even when the shutter device 42 is in the fully closed state, the warm air around the engine 4 is drawn into the vehicle front side by the negative pressure, generated by the blower 44, and is pressed into the radiator 7 and the exterior heat exchanger 13 by the blower 44. At the end of step S109, the flowchart of FIG. 5 ends and restarts from step S101.

By performing the control processing shown in FIG. 5 described above, in a case where the IG switch 50 is in the on state, the control unit 48 executes the shutter open degree control and switches the blower 44 into the second blowing state when the engine coolant temperature TMPw is equal to or lower than the temperature determination value TMP1 and when the outdoor-unit refrigerant pressure Prf is equal to or lower than the refrigerant pressure determination value P1rf. In the shutter open degree control, as the vehicle speed becomes higher, the open degree of the shutter device 42 is decreased. While the vehicle 100 is stopped, the shutter device 42 is opened.

It should be noted that the above-mentioned processing in each step shown in FIG. 5 configures a functional portion that achieves the corresponding function. The same goes for the flowchart of FIG. 8 to be described later.

As mentioned above, according to the present embodiment, in a case where the IG switch 50 is in the on state, the shutter open degree control is executed, and the blower 44 is switched to the second blowing state when the engine coolant temperature TMPw is equal to or lower than the temperature determination value TMP1 and when the outdoor-unit refrigerant pressure Prf is equal to or lower than the refrigerant pressure determination value P1rf. Specifically, in the case where the IG switch 50 is in the on state, steps S108 and S109 shown in FIG. 5 are executed when the engine coolant temperature TMPw is equal to or lower than the temperature determination value TMP1 and when the outdoor-unit refrigerant pressure Prf is equal to or lower than the refrigerant pressure determination value P1rf. By executing steps S108 and S109, the blower 44 is switched to the second blowing state, while an open degree of the shutter device 42 is set to a closing side from the maximum open degree of the shutter device 42. Thus, the engine coolant is less likely to be cooled by the traveling air which is the cold air outside the vehicle, and concurrently, the hot air from the engine 4 can be directed toward the radiator 7.

Consequently, the engine coolant can be heated more easily by the radiator 7, thereby accelerating the temperature increase of the engine coolant. As a result, the warming-up of the engine 4 can be accelerated, further improving the fuel efficiency of the vehicle 100. The fuel efficiency of the vehicle 100 is, for example, a traveling distance of the vehicle 100 per unit consumption of fuel. The improvement in fuel efficiency of the vehicle 100 means that the traveling distance of the vehicle 100 per unit consumption of the fuel is extended.

As the outdoor-unit refrigerant pressure Prf is also determined as mentioned above, it can be determined whether or not the refrigeration cycle circuit 3 is in a situation where the exterior heat exchanger 13 should be cooled in order to secure the air-conditioning performance of the refrigeration cycle circuit 3. If the refrigeration cycle circuit 3 is in the situation where the exterior heat exchanger 13 should be cooled, the hot air from the engine 4 is avoided from being sent to the exterior heat exchanger 13, thus making it easier to secure the air-conditioning performance of the refrigeration cycle circuit 3.

While the engine 4 is cold, for example, snow may adhere to the blades 421 of the shutter device 42. As such, when snow adheres to the blades 421 of the shutter device 42, the adhering snow can be melted with hot air from the engine 4.

According to the present embodiment, as shown in FIG. 2, the exterior heat exchanger 13 is disposed between the shutter device 42 and the radiator 7, and the shutter device 42 is attached to the exterior heat exchanger 13. Thus, the exterior heat exchanger 13 and the shutter device 42 can be attached to the vehicle body as an integrated structure.

According to the present embodiment, as shown in FIG. 5, in the shutter open degree control, as the vehicle speed becomes higher, the open degree of the shutter device 42 is decreased. Specifically, in step S108 shown in FIG. 5, when setting the open degree of the shutter device 42 at a closing side from the maximum open degree of the shutter device 42, the control unit 48 decreases the open degree of the shutter device 42 as the vehicle speed becomes higher. Thus, the open degree of the shutter device 42 can be set to a value corresponding to an air pressure of the traveling air which is made stronger as the vehicle speed becomes higher.

According to the present embodiment, in the shutter open degree control, the shutter device 42 is opened while the vehicle 100 is stopped. Specifically, suppose that in a case where the IG switch 50 is in the on state, the engine coolant temperature TMPw is equal to or lower than the temperature determination value TMP1 and the outdoor-unit refrigerant pressure Prf is equal to or lower than the refrigerant pressure determination value P1rf. In this case, unless the vehicle 100 is stopped, the blower 44 is switched to the second blowing state while the open degree of the shutter device 42 is set at a closing side from the maximum open degree of the shutter device 42, as mentioned above. Meanwhile, in a case where the IG switch 50 is in the on state, steps S107 and S109 shown in FIG. 5 are executed if the vehicle 100 is stopped when the engine coolant temperature TMPw is equal to or lower than the temperature determination value TMP1 and when the outdoor-unit refrigerant pressure Prf is equal to or lower than the refrigerant pressure determination value P1rf. In step S107, the shutter device 42 is opened, and in step S109, the blower 44 is switched to the second blowing state.

Here, as there is no traveling air while the vehicle is stopped, the shutter device 42 does not need to be closed. Thus, when the vehicle is stopped, the air blown from the blower 44 toward the vehicle front side easily passes through the radiator 7 and the exterior heat exchanger 13 because of the opening of the shutter device 42, so that the warming-up of the engine 4 can be accelerated, as compared to when the shutter device 42 is closed.

According to the present embodiment, as shown in FIGS. 3A to 3D, as the open degree of the shutter device 42 is decreased, the volume of air passing through the shutter device 42 becomes smaller. Thus, the volume of air passing through the radiator 7 and the exterior heat exchanger 13 can be adjusted by the shutter device 42.

According to the present embodiment, the shutter device 42 deflects the air passing through the shutter device 42 in the direction intersecting the vehicle front-rear direction DR1. Thus, when the vehicle 100 is a vehicle in which the direction of traveling air flowing into the engine room 40 should be deflected with respect to the vehicle front-rear direction DR1, the shutter device 42 can deflect the traveling air in an appropriate direction.

Vehicles have different layouts or the like in their engine rooms, and hence the appropriate direction of the traveling air differs depending on the vehicle. For example, in the present embodiment, the direction of the air passing through the shutter device 42 is deflected downward as indicated by the arrow ARa in FIGS. 3B and 3C, so that the traveling air can be guided to the lower side of the engine 4, thereby reducing the traveling resistance of the vehicle 100.

Second Embodiment

Next, a second embodiment will be described. In the present embodiment, differences from the above-mentioned first embodiment will be mainly described. The same or equivalent parts as those of the above-mentioned first embodiment will be omitted or simplified. This also applies to a third embodiment described later.

Figure 6:
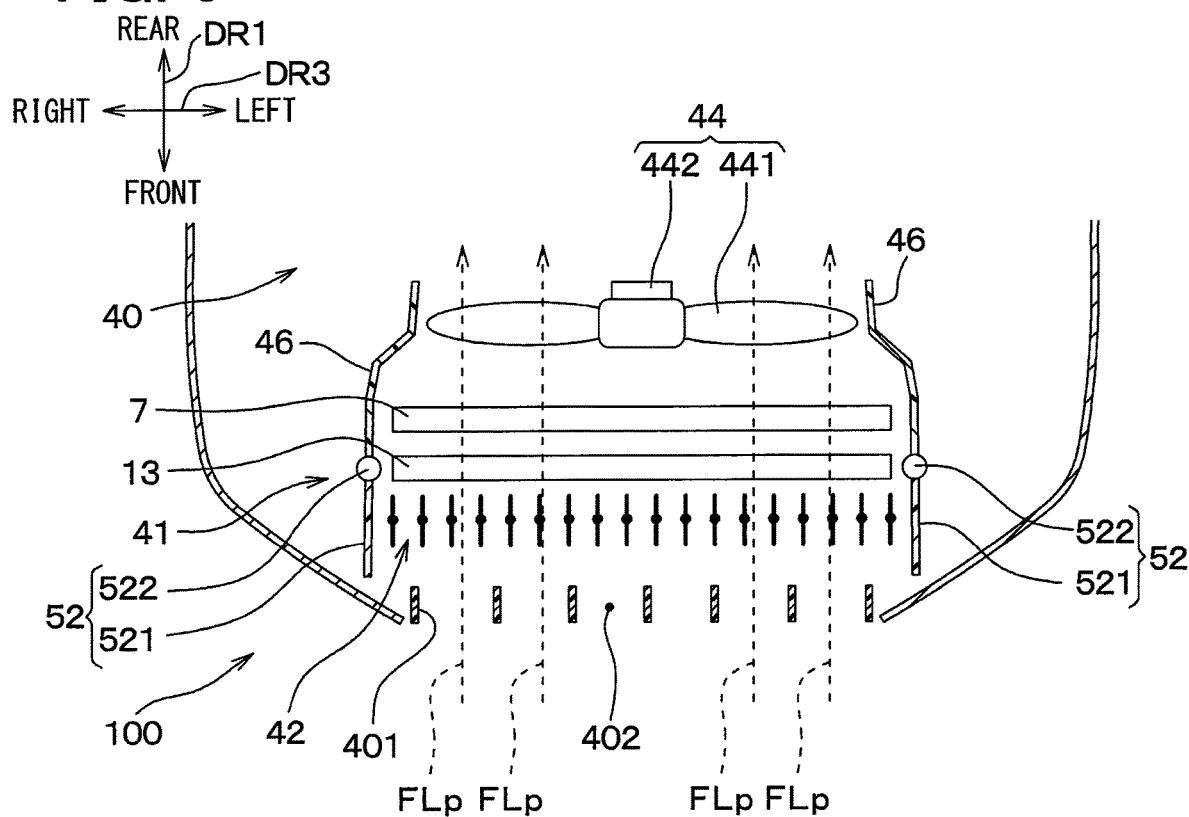
FIG. 6 is a schematic diagram schematically showing a cross section of a vehicle front portion viewed from the upper side in a second embodiment, and specifically showing a state in which the shutter device is in a fully open state and the blower is in the first blowing state.
Figure 7:
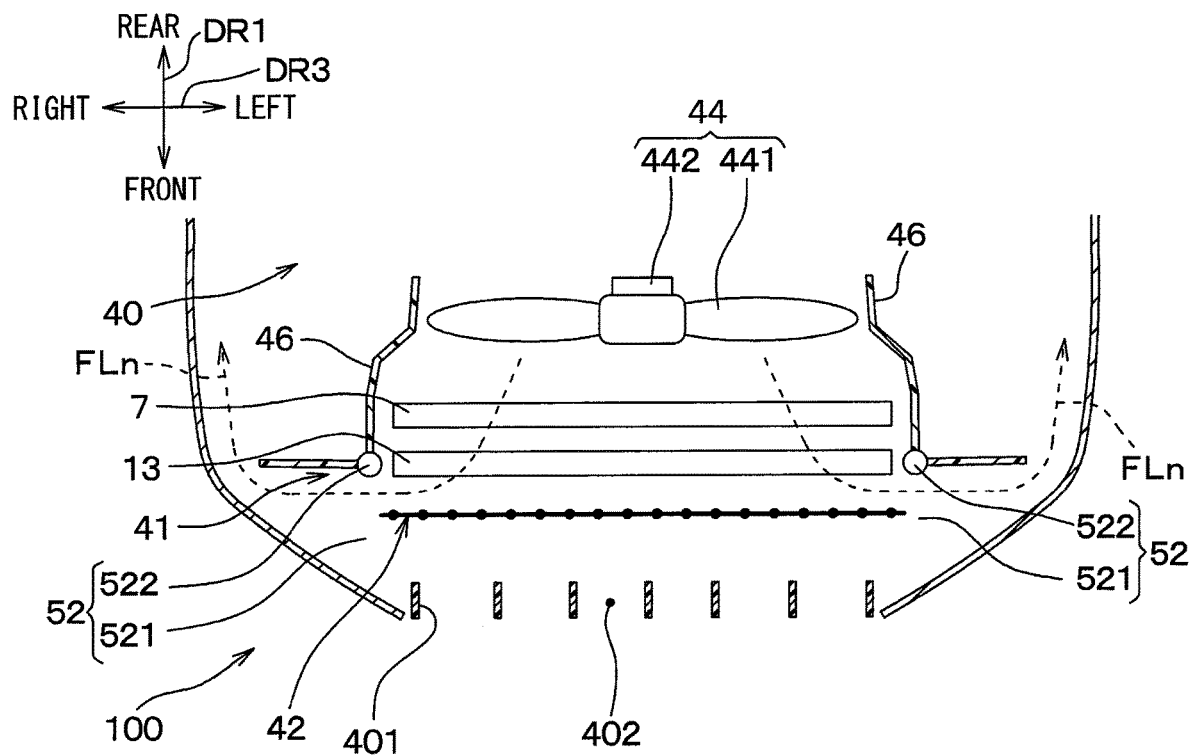
FIG. 7 is a schematic diagram schematically showing a cross section of the vehicle front portion viewed from the upper side in the second embodiment, and specifically showing a state in which the shutter device is in the fully closed state and the blower is in the second blowing state.

FIGS. 6 and 7 are schematic diagrams schematically showing cross sections of a vehicle front part as viewed from the upper side in the present embodiment. FIG. 6 shows a case in which the shutter device 42 is set in the fully open state and the blower 44 is brought into the first blowing state in the control processing shown in FIG. 5. Meanwhile, FIG. 7 shows a case in which the shutter device 42 is set in the fully closed state and the blower 44 is switched to the second blowing state in the control processing shown in FIG. 5.

As shown in FIGS. 6 and 7, in the present embodiment, the vehicle 100 includes a pair of opening/closing mechanisms 52 that are arranged symmetrically in the vehicle width direction DR3. The opening/closing mechanisms 52 is included in the cooling module 41. That is, in the present embodiment, the cooling module 41 including the opening/closing mechanisms 52 and the control unit 48 function as a heat exchange unit. The present embodiment differs from the first embodiment in these respects.

In the present embodiment, the axial direction of a rotary shaft 422 of the shutter device 42 is the vehicle up-down direction DR2. The present embodiment also differs from the first embodiment in this respect.

Specifically, as shown in FIGS. 6 and 7, each of the pair of opening/closing mechanisms 52 has a plate-shaped rotation door 521 and a door rotary shaft 522 to which one end of the rotation door 521 is fixed. Each of the opening/closing mechanisms 52 is electrically operated to open and close in response to a control signal from the control unit 48. The shaft direction of the door rotary shaft 522 is the vehicle up-down direction DR2.

The pair of opening/closing mechanisms 52 is attached to the respective shrouds 46. That is, each door rotary shaft 522 is attached to the corresponding shroud 46, and the door rotary shaft 522 and the rotation door 521 are rotatable with respect to the shroud 46. The opening/closing mechanism 52 is operated to open and close by the rotation of the rotation door 521.

The pair of opening/closing mechanisms 52 respectively opens and closes a part of the shroud 46. In detail, the opening/closing mechanism 52 opens and closes the shroud 46 between the radiator 7 and the shutter device 42.

Now, the opening/closing control of the opening/closing mechanism 52 performed by the control unit 48 will be described. In the present embodiment, the control processing shown in FIG. 5 is executed in the same manner as in the first embodiment, and the opening/closing control of the opening/closing mechanism 52 is executed during the control processing shown in FIG. 5.

In detail, in step S104 shown in FIG. 5, the control unit 48 performs the processing contents, executed in the first embodiment, and in addition, closes a pair of opening/closing mechanisms 52 as shown in FIG. 6. If the opening/closing mechanism 52 is already closed, the opening/closing mechanism 52 remains closed. Thus, as indicated by the arrows FLp of FIG. 6, the traveling air from the vehicle front side is guided to pass through the radiator 7 and the exterior heat exchanger 13.

In step S108 shown in FIG. 5, the control unit 48 performs the processing contents, executed in the first embodiment, and in addition, opens a pair of opening/closing mechanisms 52 as shown in FIG. 7. If the opening/closing mechanisms 52 are already open, the opening/closing mechanisms 52 remain open.

Likewise, also in step S107 shown in FIG. 5, the control unit 48 performs the processing contents, executed in the first embodiment, and in addition, opens the pair of opening/closing mechanisms 52. In detail, if step S107 or step S108 shown in FIG. 5 is executed, step S109 is also executed along with this. Thus, the control unit 48 opens the opening/closing mechanism 52 when the blower 44 is switched to the second blowing state.

Thus, the air blown from the blower 44 in the second blowing state passes through the radiator 7 and the exterior heat exchanger 13 as indicated by the arrow FLn of FIG. 7, and then circulates in the engine room 40 through a part of the shroud 46 which is opened by the opening/closing mechanisms 52. Thus, the blown air resistance exhibited when the blower 44 blows air in the second blowing state is reduced, as compared to when the opening/closing mechanisms 52 are closed. The reduction effect of the blown air resistance can be obtained regardless of the open degree of the shutter device 42, but in particular, this effect is remarkably exhibited when the shutter device 42 is in the fully closed state.

Thus, the air blown by the blower 44 more easily passes through the radiator 7 and the exterior heat exchanger 13 as indicated by the arrows FLn in FIG. 7, and the hot air from the engine 4 is easily directed to the radiator 7 and the exterior heat exchanger 13.

The present embodiment can obtain the effects exhibited by the structure in common with the above-mentioned first embodiment in the same manner as in the first embodiment.

Further, according to the present embodiment, the pair of opening/closing mechanisms 52 respectively opens and closes a part of the shroud 46. Thus, the present embodiment can achieve both guiding the traveling air flowing from the vehicle front side into the engine room 40 so that the traveling air passes through the radiator 7 and the exterior heat exchanger 13, and reducing the blowing air resistance when the blower 44 is switched to the second blowing state to blow air.

The pair of opening/closing mechanisms 52 is attached to the respective shrouds 46. Thus, the opening/closing mechanisms 52 and the shrouds 46 can be attached to, for example, a vehicle body as an integrated structure.

Third Embodiment

Next, a third embodiment will be described below. In the present embodiment, differences from the above-mentioned first embodiment will be mainly described.

Figure 8:
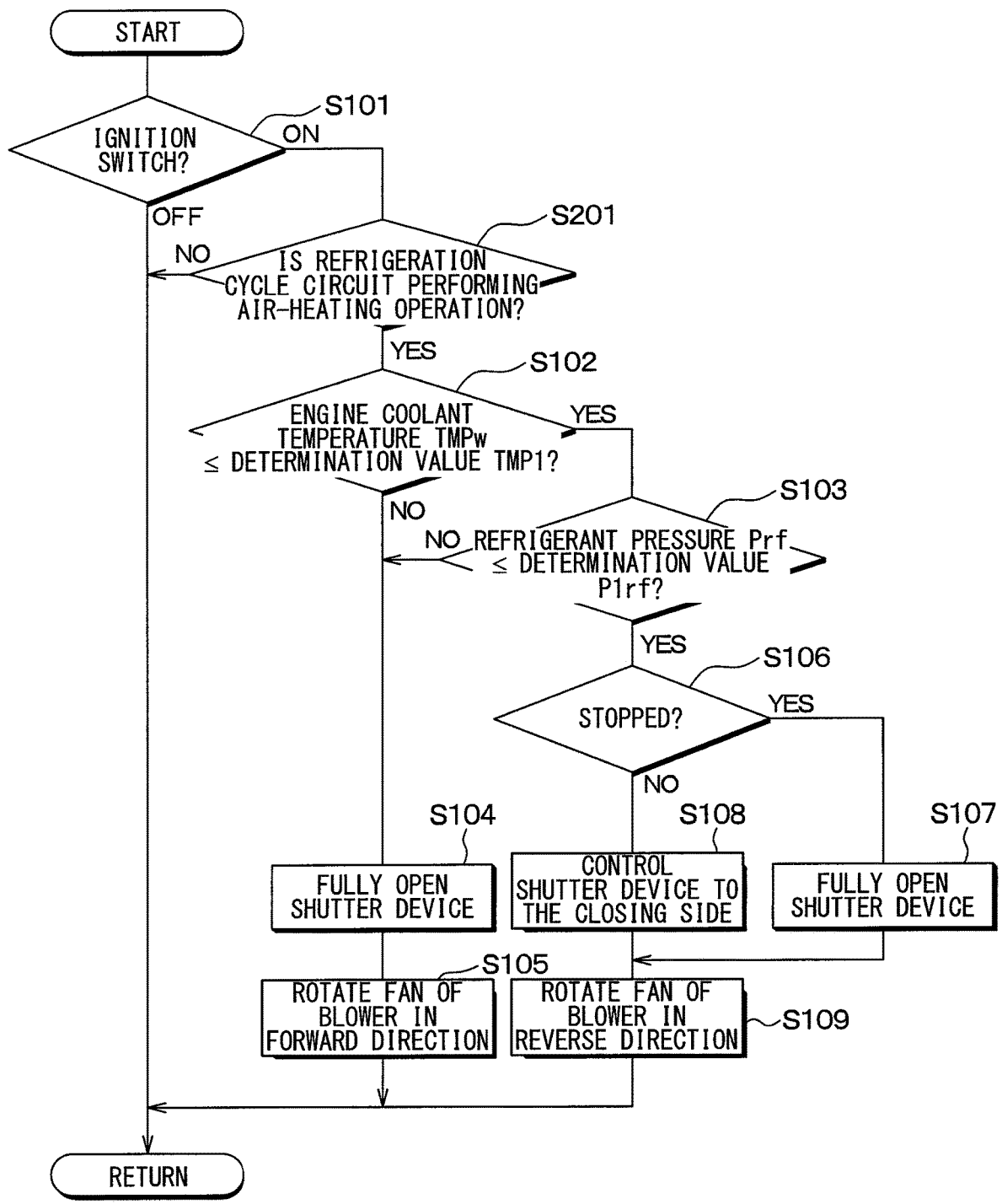
FIG. 8 is a flowchart showing control processing executed by a control unit in a third embodiment, which corresponds to FIG. 5 of the first embodiment.

FIG. 8 is a flowchart showing control processing for executing the shutter open degree control and the blower control in the present embodiment, and specifically, a diagram corresponding to FIG. 5 of the first embodiment. As shown in FIG. 8, the flowchart of the present embodiment includes step S201 that is interposed between step S101 and step S102. The present embodiment differs from the first embodiment in this respect.

Specifically, as shown in FIG. 8, when the IG switch 50 is determined to be in the on state in step S101, the control processing proceeds to step S201. In step S201, the control unit 48 determines whether or not the refrigeration cycle circuit 3 is performing an air-heating operation.

The term "air-heating operation of the refrigeration cycle circuit 3" refers to an air-conditioning operation for warming the vehicle interior with heat of the refrigerant in the refrigeration cycle circuit 3. For example, the expression "while the refrigeration cycle circuit 3 is performing an air-heating operation" corresponds to when the refrigeration cycle circuit 3 is operating in the air-heating mode or the air-heating dehumidifying mode. Thus, the control unit 48 can determine whether or not the refrigeration cycle circuit 3 is performing the air-heating operation, for example, based on the operating states of the solenoid valves 36 and 37 and the electronic expansion valves 11 and 12.

When the refrigeration cycle circuit 3 is determined to be performing the air-heating operation in step S201, the control processing proceeds to step S102. Meanwhile, when the refrigeration cycle circuit 3 is determined not to be performing the air-heating operation, for example, when the refrigeration cycle circuit 3 is determined to be performing an air-cooling operation or stopped, the flowchart of FIG. 8 is ended, and the control processing restarts from step S101.

In this way, in a case where the IG switch 50 is in the on state while the refrigeration cycle circuit 3 is performing the air-heating operation, the control unit 48 executes the shutter open degree control and switches the blower 44 to the second blowing state when the engine coolant temperature TMPw is equal to or lower than the temperature determination value TMP1 and when the outdoor-unit refrigerant pressure Prf is equal to or lower than the refrigerant pressure determination value P1rf. Specifically, in the case where the IG switch 50 is in the on state while the refrigeration cycle circuit 3 is performing the air-heating operation, steps S108 and S109 shown in FIG. 8 are executed when the engine coolant temperature TMPw is equal to or lower than the temperature determination value TMP1 and when the outdoor-unit refrigerant pressure Prf is equal to or lower than the refrigerant pressure determination value P1rf. By executing steps S108 and S109, the blower 44 is switched to the second blowing state while the open degree of the shutter device 42 is set at a closing side from the maximum open degree of the shutter device 42.

Thus, waste heat from the engine (i.e., hot air from the engine 4) is circulated in the engine room 40, while suppressing cold air outside the vehicle from flowing into the engine room 40, thereby making it possible to warm the exterior heat exchanger 13, refrigerant pipes, and the like that are included in the refrigeration cycle circuit 3. Consequently, the air-heating performance of the refrigeration cycle circuit 3 can be improved.

Frost formation at the exterior heat exchanger 13 can be avoided while the refrigeration cycle circuit 3 is performing the air-heating operation. While the exterior heat exchanger 13 functions as an evaporator during the air-heating operation of the refrigeration cycle circuit 3, the heat exchange unit can suppress cooling damage that would be caused by the traveling air cooled in the exterior heat exchanger 13 and flowing to the radiator 7 and the engine 4, at the time of warming up the engine 4.

For example, if any air-heating electric heater is provided in the vehicle 100 of the present embodiment, the operating rate of the electric heater can be reduced. As a result, the cruising distance of the vehicle 100 of the present embodiment, which is a hybrid vehicle, can be extended.

The present embodiment can obtain the effects exhibited by the structure in common with the above-mentioned first embodiment in the same manner as in the first embodiment.

The present embodiment is a modification based on the first embodiment. However, the present embodiment can also be combined with the above-mentioned second embodiment.

Other Embodiments (1) Although in the above-mentioned respective embodiments, the vehicle 100 is a hybrid vehicle, the vehicle 100 is not limited thereto and may be, for example, an electric vehicle or an engine vehicle without having a traveling electric motor 32. When the vehicle 100 is the above-mentioned engine vehicle, the on state of the IG switch 50 means that the engine 4 is operating.

(2) In the above-mentioned first embodiment, when the open degree of the shutter device 42 is smaller than the maximum open degree, the shutter device 42 deflects the direction of the air passing through the shutter device 42 downward as indicated by the arrows ARa in FIGS. 3B and 3C. However, this is only an example, and the direction of the deflected air is not limited to the downward direction, but actual various vehicles can also be envisaged to have the intake air deflected in any direction, such as an upward, rightward, or leftward direction. Various vehicles have different layouts and the like in their engine rooms 40, and hence the appropriate direction of the traveling air differs depending on each vehicle.

In short, when the open degree of the shutter device 42 is smaller than the maximum open degree, the shutter device 42 may deflect the air passing through the shutter device 42 in the direction intersecting the vehicle front-rear direction DR1 as appropriate. In this way, the traveling air flowing into the engine room 40 can be deflected in the appropriate direction in the vehicle where the direction of the traveling air should be deflected with respect to the vehicle front-rear direction DR1.

(3) In the above-mentioned respective embodiments, when the open degree of the shutter device 42 is the minimum open degree, the blades 421 of the shutter device 42 are in contact with each other to close the mutual clearance between the blades 421. However, this is only an example, and any mutual clearance may be formed at the minimum open degree of the shutter device 42 as long as the mutual clearance between the blades 421 is minimal.

(4) In the above-mentioned respective embodiments, when the shutter device 42 is in the fully open state, as shown in FIG. 3A, for example, each of the plurality of blades 421 is oriented in the direction along the vehicle front-rear direction DR1, but may be inclined with respect to the vehicle front-rear direction DR1 in the manner as shown in FIGS. 3B and 3C. Nevertheless, even in such a case, an inclination angle of the blades 421 with respect to the vehicle front-rear direction DR1 in the fully open state of the shutter device 42 is smaller than an inclination angle in the semi-open state on the larger open degree side.

(5) In the above-described respective embodiments, the shutter device 42 is formed in a louver shape, but the structure of the shutter device 42 is not limited thereto. For example, the shutter device 42 may be selectively switched between the fully open state and the fully closed state, and may be configured not to be capable of adjusting its open degree to a value between the fully open state and the fully closed state.

(6) Although in the above-mentioned first embodiment, in step S103 shown in FIG. 5, the refrigerant pressure at the refrigerant inlet of the exterior heat exchanger 13 is detected as the outdoor-unit refrigerant pressure Prf, the refrigerant pressure at the refrigerant outlet of the exterior heat exchanger 13 may be detected as the outdoor-unit refrigerant pressure Prf.

(7) Although in the above-mentioned first embodiment, the vehicle 100 is determined to be stopped in step S106 shown in FIG. 5 when the vehicle speed is, for example, 0 km/h, the determination of the stopping of the vehicle is not limited thereto.

For example, the vehicle 100 may be determined to be stopped when a predetermined stop determination vehicle speed is previously set experimentally as an ultra-low vehicle speed at which the vehicle 100 can be handled as being stopped and when the vehicle speed is equal to or lower than the set stop determination vehicle speed. In this case, when the vehicle speed is higher than the stop determination vehicle speed, the control unit 48 determines that the vehicle 100 is traveling.

(8) In the above-mentioned first embodiment, in step S107 shown in FIG. 5, the shutter device 42 is in the fully open state, but is not limited thereto, and the shutter device 42 may be open. For example, in step S107, the shutter device 42 may be in a semi-open state as shown in FIG. 3B or 3C.

(9) Although in the above-mentioned first embodiment, the flowchart shown in FIG. 5 includes steps S106 and S107, a flowchart that does not include steps S106 or S107 can be proposed. In such a flowchart, when the outdoor-unit refrigerant pressure Prf is determined to be equal to or lower than the refrigerant pressure determination value P1rf in step S103, the control processing proceeds to step S108.

(10) Although in the above-mentioned first embodiment, the flowchart shown in FIG. 5 includes step S103, a flowchart that does not include step S103 can be proposed. In such a flowchart, when the engine coolant temperature TMPw is determined to be equal to or lower than the temperature determination value TMP1 in step S102, the control processing proceeds to step S106.

(11) In the above-mentioned respective embodiments, the cooling module 41 disposed in the engine room 40 has the exterior heat exchanger 13. However, the exterior heat exchanger 13 is not essential. Without any exterior heat exchanger 13, for example, the flowchart shown in FIG. 5 does not include step S103.

(12) In the above-mentioned first embodiment, in step S108 shown in FIG. 5, as the vehicle speed becomes higher, the open degree of the shutter device 42 is decreased. However, this is only an example. For instance, in step S108, the control unit 48 may close the shutter device 42, including bringing the shutter device 42 into the fully closed state, regardless of the vehicle speed. In this way, the inflow of the traveling air into the engine room 40 can be blocked by the shutter device 42 when accelerating the warming-up of the engine 4.

(13) In the above-mentioned respective embodiments, the refrigeration cycle circuit 3 is operated in any of a plurality of operation modes. A plurality of operation modes of the refrigeration cycle circuit 3 are not necessarily provided, but a single operation mode may be provided. For example, the refrigeration cycle circuit 3 may only be operated in the air-heating mode.

(14) In the above-mentioned respective embodiments, the shutter device 42 is attached to the exterior heat exchanger 13, but this is only an example. For instance, the shutter device 42 may be a grille shutter attached to the vehicle body.

(15) In the above-mentioned second embodiment, the opening/closing mechanism 52 shown in FIGS. 6 and 7 opens and closes a part of the shroud 46. The part opened and closed is not necessarily limited to a part of the shroud 46. In short, the opening/closing mechanisms 52 may open and close at least a part of the shroud 46.

(16) In the above-mentioned second embodiment, the opening/closing mechanism 52 is a door mechanism that opens and closes by the rotation of the rotation door 521, but this is only an example. For instance, the opening/closing mechanism 52 may open and close together with the sliding of a film, or may be formed in a louver shape, like the shutter device 42.

(17) In the above-mentioned third embodiment, the expression "while the refrigeration cycle circuit 3 is performing an air-heating operation" corresponds to when the refrigeration cycle circuit 3 is operating in the air-heating mode or the air-heating dehumidifying mode. However, this is only an example. For instance, only a case where the refrigeration cycle circuit 3 is operated in the air-heating mode may correspond to when the refrigeration cycle circuit 3 is performing the air-heating operation.

(18) In the above-mentioned respective embodiments, as shown in the flowcharts of FIGS. 5 and 8, the blower 44 is selectively switched between the first blowing state and the second blowing state. Alternatively, the blower 44 may be switched not only to the first blowing state or second blowing state, but also to a stopped state as appropriate.

(19) In the above-mentioned respective embodiments, the heat of the refrigerant in the refrigeration cycle circuit 3 is transferred to the conditioned air via the engine coolant in the air-heating mode and the air-heating dehumidifying mode of the refrigeration cycle circuit 3. However, this is only an example. For example, the refrigerant in the refrigeration cycle circuit 3 and the conditioned air may exchange heat with each other without the involvement of the engine coolant, thereby heating the conditioned air.

(20) In the above-mentioned respective embodiments, the shutter device 42 is formed in a louver shape, but this is only an example. For instance, the shutter device 42 may be formed in a blind shape, or may be operated to open and close by a slide door.

(21) In the above-mentioned respective embodiments, as shown in FIG. 1, the control unit 48 for controlling the shutter device 42 and the blower 44 is included in the controller 10 that controls the compressor 2, the electronic expansion valves 11 and 12, and the like, but this is only an example. For instance, the control unit 48 may be provided as a separate controller from the controller 10.

(22) In the above-mentioned respective embodiments, the processing in each step shown in the flowcharts of FIGS. 5 and 8 is achieved by a computer program, but may be configured of a hard logic.

The present disclosure is not intended to be limited to the embodiments described above. The present disclosure contains various modifications and other modifications within the scope of equivalents. The above-mentioned respective embodiments are not independent of each other, and can be combined together as appropriate except when the combination is clearly impossible.

In the above-mentioned respective embodiments, it is apparent that the elements configuring the embodiments are not necessarily essential, except when they are clearly indicated as being especially essential and when they are considered to be obviously essential in principle.

In the above-mentioned respective embodiments, in the case of referring to a specific number about a constituent element of the present embodiment, such as the number, numerical value, amount, range, and the like, the element is not limited to the specific number except when the specific number is clearly described to be especially essential or except when the element is clearly limited to the specific number in principle, or the like. In the above-mentioned respective embodiments, in the case of referring to a material, shape, positional relationship, and the like of constituent elements, the constituent element is not limited to the material, shape, positional relationship, and the like unless otherwise specified and except when the constituent element is limited to the specific material, shape, positional relationship, and the like in principle.

For example, in step S108 shown in FIGS. 5 and 8, as long as the open degree of the shutter device 42 is set at a closing side from the maximum open degree of the shutter device 42, the control unit 48 may maintain the state of the shutter device 42 as it is without executing the control for operating the shutter device 42. Even when the state of the shutter device 42 is maintained as it is in this way, the control unit 48 switches the blower 44 into the second blowing state in step S109 following step S108. The expression "while the open degree of the shutter device 42 is set at a closing side from the maximum open degree of the shutter device 42" as used herein includes the semi-opened state, the fully closed state, and the like of the shutter device 42.

SUMMARY

According to a first aspect described in a part or all of the above-mentioned respective embodiments, in a case where a switch that makes a vehicle travelable is in an on state, the control unit switches the blower to the second blowing state while setting an open degree of the shutter device to close the shutter device more than at a maximum open degree when a temperature of the engine coolant is equal to or lower than a predetermined temperature determination value.

According to a second aspect, in the case where the switch is in the on state, the control unit switches the blower to the second blowing state while setting the open degree of the shutter device to close the shutter device more than the maximum open degree, when the temperature of the engine coolant is equal to or lower than the temperature determination value, and when a refrigerant pressure in the exterior heat exchanger is equal to or lower than a predetermined refrigerant pressure determination value. Thus, in order to secure the air-conditioning performance of the refrigeration cycle circuit including the exterior heat exchanger, it can be determined whether or not the refrigeration cycle circuit should cool the exterior heat exchanger. If the refrigeration cycle circuit should cool the exterior heat exchanger, the hot air from the engine is avoided from being sent to the exterior heat exchanger, thus making it easier to secure the air-conditioning performance of the refrigeration cycle circuit.

According to a third aspect, the exterior heat exchanger is disposed between the shutter device and the coolant heat exchanger, and the shutter device is attached to the exterior heat exchanger. Thus, the exterior heat exchanger and the shutter device can be attached to, for example, the vehicle body as an integrated structure.

According to a fourth aspect, in a case where the switch is in the on state while a refrigeration cycle circuit including the exterior heat exchanger is performing an air-heating operation, the control unit switches the blower to the second blowing state while setting the open degree of the shutter device to close the shutter device more than the maximum open degree, when the temperature of the engine coolant is equal to or lower than the temperature determination value, and when the refrigerant pressure in the exterior heat exchanger is equal to or lower than the refrigerant pressure determination value. Thus, waste heat from the engine is circulated in the engine room, while suppressing cold air outside the vehicle cabin from flowing into the engine room, thereby making it possible to warm the exterior heat exchanger, refrigerant pipes, and the like that are included in the refrigeration cycle circuit. Consequently, the air-heating performance of the refrigeration cycle circuit can be improved.

Frost formation at the exterior heat exchanger can be avoided while the refrigeration cycle circuit is performing the air-heating operation. While the exterior heat exchanger functions as an evaporator during the air-heating operation of the refrigeration cycle circuit, the heat exchange unit can suppress cooling damage that would be caused by the traveling air cooled in the exterior heat exchanger and flowing to the coolant heat exchanger and the engine, at the time of warming up the engine.

For example, if any air-heating electric heater is provided, the operating rate of the electric heater can be reduced. Consequently, when the vehicle on which the heat exchange unit is mounted is a hybrid vehicle, a plug-in hybrid vehicle, or an electric vehicle, the cruising distance of the vehicle can be extended.

According to a fifth aspect, the passage for the traveling air is closed with the shutter device while the open degree of the shutter device is set to close the shutter device more than the maximum open degree. Thus, the inflow of the traveling air into the engine room can be blocked by the shutter device when accelerating the warming-up of the engine.

According to a sixth aspect, the control unit decreases the open degree of the shutter device as the vehicle speed becomes higher when the control unit sets the open degree of the shutter device to close the shutter device more than at the maximum open degree. Thus, the open degree of the shutter device can be set to a value corresponding to an air pressure of the traveling air that becomes stronger as the vehicle speed becomes higher.

According to a seventh aspect, in the case where the switch is in the on state, if the vehicle is stopped, the control unit opens the shutter device and switches the blower to the second blowing state when the temperature of the engine coolant is equal to or lower than the temperature determination value. Here, as there is no traveling air while the vehicle is stopped, the shutter device does not need to be closed. Thus, when the vehicle is stopped, the air blown from the blower toward the vehicle front side easily passes through the coolant heat exchanger, so that the warming-up of the engine can be accelerated more than when the shutter device is closed.

According to an eighth aspect, the volume of air passing through the shutter device becomes smaller as the open degree of the shutter device is decreased. Thus, the volume of air passing through the coolant heat exchanger can be adjusted by the shutter device.

According to a ninth aspect, the shutter device deflects air passing through the shutter device in a direction intersecting the vehicle front-rear direction. Thus, in vehicles where the traveling air flowing into the engine room should be deflected with respect to the vehicle front-rear direction, the traveling air can be deflected in an appropriate direction. Vehicles have different layouts or the like in their engine rooms, and hence the appropriate direction of the traveling air differs depending on the vehicle.

According to a tenth aspect, the opening/closing mechanism opens and closes at least a part of the shroud. Thus, the heat exchange unit can achieve both guiding the traveling air flowing from the vehicle front side into the engine room so that the traveling air passes through the coolant heat exchanger, and reducing the blowing air resistance when the blower is switched to the second blowing state to blow air.

The opening/closing mechanism is attached to the shroud, thereby making it possible to attach the opening/closing mechanism and the shroud to, for example, a vehicle body as an integrated structure.

What is claimed is:

1. A heat exchange unit comprising:
a coolant heat exchanger disposed on a vehicle front side in an engine room in which an engine is accommodated, the engine room being capable of taking in traveling air from the vehicle front side, the coolant heat exchanger being configured to exchange heat between an engine coolant flowing through the engine and air;
a shutter device disposed on a vehicle front side with respect to the coolant heat exchanger, the shutter device being configured to be capable of opening and closing a passage for the traveling air that is directed toward the coolant heat exchanger;
a blower disposed on a vehicle rear side with respect to the shutter device in the engine room, the blower being configured to be switchable between a first blowing state in which air flows from the vehicle front side to the vehicle rear side with respect to the coolant heat exchanger and a second blowing state in which air flows from the vehicle rear side to the vehicle front side with respect to the coolant heat exchanger;
an exterior heat exchanger of a refrigerant cycle in which a refrigerant circulates, the exterior heat exchanger being disposed on the vehicle rear side with respect to the shutter device in the engine room and being configured to exchange heat between air caused to flow by the blower and the refrigerant; and
a controller configured to switch the blower in accordance with both a temperature of the engine coolant and a refrigerant pressure in the exterior heat exchanger, wherein the controller causes the blower to set the second blowing state while setting an open degree of the shutter device at a closing side from a maximum open degree of the shutter device, when the temperature of the engine coolant is equal to or lower than a predetermined temperature determination value and when the refrigerant pressure in the exterior heat exchanger is equal to or lower than a predetermined refrigerant pressure determination value, in a case where a switch that makes a vehicle travelable is in an on state.

2. The heat exchange unit according to claim 1, wherein the exterior heat exchanger is disposed between the shutter device and the coolant heat exchanger, and
the shutter device is attached to the exterior heat exchanger.

3. The heat exchange unit according to claim 1, wherein in a case where the switch is in the on state while the refrigerant cycle including the exterior heat exchanger is performing an air-heating operation, the controller switches the blower to the second blowing state while setting the open degree of the shutter device at a closing side from the maximum open degree of the shutter device, (i) when the temperature of the engine coolant is equal to or lower than the predetermined temperature determination value, and (ii) when the refrigerant pressure in the exterior heat exchanger is equal to or lower than the predetermined refrigerant pressure determination value.

4. The heat exchange unit according to claim 1, wherein the passage for the traveling air is closed with the shutter device while the open degree of the shutter device is set at a closing side from the maximum open degree of the shutter device.

5. The heat exchange unit according to claim 1, wherein the controller decreases the open degree of the shutter device as the vehicle speed becomes higher, when the controller sets the open degree of the shutter device at a closing side from the maximum open degree of the shutter device.

6. The heat exchange unit according to claim 1, wherein if the vehicle is stopped in the case where the switch is in the on state, the controller opens the shutter device and switches the blower to the second blowing state when the temperature of the engine coolant is equal to or lower than the predetermined temperature determination value, and when the refrigerant pressure in the exterior heat exchanger is equal to or lower than the predetermined refrigerant pressure determination value.

7. The heat exchange unit according to claim 1, wherein a volume of air passing through the shutter device becomes smaller as the open degree of the shutter device decreases.

8. The heat exchange unit according to claim 1, wherein the shutter device deflects air passing through the shutter device in a direction intersecting a vehicle front-rear direction.

9. The heat exchange unit according to claim 1, further comprising:
a shroud provided to cover the passage for the traveling air between the shutter device and the coolant heat exchanger; and
an opening/closing mechanism that opens or closes at least a part of the shroud, wherein
the opening/closing mechanism is attached to the shroud.

10. The heat exchange unit according to claim 1, wherein the exterior heat exchanger is directly adjacent to the shutter device.

11. The heat exchange unit according to claim 1, wherein the refrigerant cycle includes:
a compressor configured to compress the refrigerant;
the exterior heat exchanger; and
an interior heat exchanger configured to cool the air.

12. A heat exchange unit comprising:
a coolant heat exchanger disposed on a vehicle front side in an engine room in which an engine is accommodated, the engine room configured to take in traveling air from the vehicle front side, the coolant heat exchanger being configured to exchange heat between an engine coolant flowing through the engine and air;
a shutter device disposed on a vehicle front side with respect to the coolant heat exchanger, the shutter device being configured to open and close a passage for the traveling air directed toward the coolant heat exchanger;
a blower disposed on a vehicle rear side with respect to the shutter device in the engine room, the blower being configured to switch between a first blowing state in which air flows from the vehicle front side to the vehicle rear side and a second blowing state in which air flows from the vehicle rear side to the vehicle front side;
an exterior heat exchanger of a refrigerant cycle in which a refrigerant circulates, the exterior heat exchanger disposed on the vehicle rear side in the engine room and configured to exchange heat between air caused to flow by the blower and the refrigerant; and a controller configured to switch the blower in accordance with both a temperature of the engine coolant and a refrigerant pressure in the exterior heat exchanger, wherein the controller causes the blower to set the second blowing state while setting an open degree of the shutter device at a closing side from a maximum open degree of the shutter device, in response to the temperature of the engine coolant being equal to or lower than a predetermined temperature determination value and in response to the refrigerant pressure in the exterior heat exchanger being equal to or lower than a predetermined refrigerant pressure determination value, in a case where a switch that makes a vehicle travelable is in an on state.

13. The heat exchange unit according to claim 12, wherein the controller decreases the open degree of the shutter device as the vehicle speed becomes higher, when the controller sets the open degree of the shutter device at a closing side from the maximum open degree of the shutter device.

14. The heat exchange unit according to claim 12, wherein the exterior heat exchanger is disposed between the shutter device and the coolant heat exchanger, and the shutter device is attached to the exterior heat exchanger.

15. The heat exchange unit according to claim 12, wherein the exterior heat exchanger is directly adjacent to the shutter device.

16. The heat exchange unit according to claim 12, wherein the refrigerant cycle includes:

a compressor configured to compress the refrigerant;

the exterior heat exchanger; and an interior heat exchanger configured to cool the air.

* * * * *